United States Patent
Harada

(10) Patent No.: US 8,274,262 B2
(45) Date of Patent: Sep. 25, 2012

(54) ELECTRIC VEHICLE HAVING A SECONDARY BATTERY AND A METHOD OF CHARGING AND RECHARGING THE SECONDARY BATTERY

(75) Inventor: Hironori Harada, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 400 days.

(21) Appl. No.: 12/451,355

(22) PCT Filed: Jun. 30, 2008

(86) PCT No.: PCT/JP2008/062248
§ 371 (c)(1),
(2), (4) Date: Nov. 9, 2009

(87) PCT Pub. No.: WO2009/011239
PCT Pub. Date: Jan. 22, 2009

(65) Prior Publication Data
US 2010/0123438 A1    May 20, 2010

(30) Foreign Application Priority Data
Jul. 18, 2007 (JP) ................ 2007-186600

(51) Int. Cl.
*H01M 10/44* (2006.01)
*H01M 10/46* (2006.01)
(52) U.S. Cl. ........................................ 320/137
(58) Field of Classification Search .......... 320/107, 320/124, 125, 137, 160, 162
See application file for complete search history.

(56) References Cited

U.S. PATENT DOCUMENTS
3,599,072 A * 8/1971 Becker ............... 320/153
(Continued)

FOREIGN PATENT DOCUMENTS
JP    A-7-111736    4/1995
(Continued)

OTHER PUBLICATIONS

Notice of Grounds for Rejection issued on Oct. 7, 2008 in the corresponding Japanese Patent Application No. 2007-186600 (with English-language translation).

(Continued)

*Primary Examiner* — Edward Tso
(74) *Attorney, Agent, or Firm* — Oliff & Berridge, PLC

(57) ABSTRACT

An electric vehicle includes a secondary battery which performs charge from an external power source and travels by using power of the secondary battery. The electric vehicle further includes: a charging unit which charges the secondary battery with power supplied by connecting a charge plug to the external power source; and a control unit which performs information acquisition or control for respective constituent elements. The control unit acquires a remaining capacity value from the secondary battery upon charge. When the control unit judges that a high charge capacity state continues a predetermined number of times, the control unit performs charge up to a charge capacity lower than a full electric capacity amount. This can suppress degradation of the secondary battery by charge.

12 Claims, 5 Drawing Sheets

U.S. PATENT DOCUMENTS

| | | | |
|---|---|---|---|
| 4,031,450 A * | 6/1977 | Hammel et al. | 320/153 |
| 5,296,797 A * | 3/1994 | Bartlett | 320/145 |
| 5,329,219 A * | 7/1994 | Garrett | 320/150 |
| 5,440,221 A * | 8/1995 | Landau et al. | 320/155 |
| 6,194,874 B1 * | 2/2001 | Kalogeropoulos et al. | 320/160 |
| 6,608,396 B2 | 8/2003 | Downer et al. | |
| 6,771,046 B2 | 8/2004 | Ariga et al. | |
| 2002/0112489 A1 * | 8/2002 | Egawa et al. | 62/133 |
| 2003/0169017 A1 | 9/2003 | Ariga et al. | |

FOREIGN PATENT DOCUMENTS

| | | |
|---|---|---|
| JP | A-7-111836 | 5/1995 |
| JP | A-8-149608 | 6/1996 |
| JP | A-8-154307 | 6/1996 |
| JP | A-10-142302 | 5/1998 |
| JP | A-11-341698 | 12/1999 |
| JP | A-2003-209969 | 7/2003 |
| JP | A-2003-219570 | 7/2003 |

OTHER PUBLICATIONS

International Search Report issued on Oct. 14, 2008 in the corresponding International Application No. PCT/JP2008/062248.

International Preliminary Report on Patentability issued in corresponding International Application No. PCT/JP2008/062248, issued Feb. 9, 2010.

* cited by examiner

ELECTRIC VEHICLE HAVING A SECONDARY BATTERY AND A METHOD OF CHARGING AND RECHARGING THE SECONDARY BATTERY

TECHNICAL FIELD

The present invention relates to an electric vehicle having a secondary battery and a method of charging a secondary battery of an electric vehicle.

BACKGROUND ART

Hybrid vehicles including an engine and a motor as driving sources and a secondary battery as an electric power supply, and electrically-powered vehicles such as electric vehicles are capable of EV traveling, i.e. traveling in which the motor is driven only with electric power stored in the secondary battery and without using the engine for travelling. As the EV travelling is quiet and pollution free, extension of a distance traveled with the EV travelling is desired.

In some types of hybrid vehicles, it is possible to charge the secondary battery externally from outside the vehicle. In these types of hybrid vehicles, while it is necessary to increase the capacity of a secondary battery which is mounted in order to extend the distance of EV travelling, the volume of secondary batteries loaded should be limited in consideration of the power performance and interior comfort of a vehicle. Consequently, as described in JP 8-154307 A, for example, the EV travelling distance depends on the remaining capacity of the secondary battery, and can be extended if the second battery is charged up to a full-charge capacity at the time of charge.

Further, in lithium ion batteries, when a voltage between positive and negative electrode terminals is higher than the rated voltage, degradation occurs, in which a full-charge capacity (reversible capacitance) is lowered. JP 10-142302 A describes a method of calculating such a degradation amount to obtain the remaining capacity.

Here, in lithium ion batteries, there are cases where the battery is degraded when a high charge capacity state continues. The degradation of the battery results in a problem that the full-charge capacity is lowered to thereby shorten the EV travelling distance.

JP 8-154307 A describes an invention which aims at reducing travelling which depends on an internal combustion engine in a hybrid vehicle to thereby encourage more active use of EV travelling, and includes no description concerning degradation of the secondary battery. Further, JP 10-142302 A describes an invention which aims at estimating the degradation amount of a lithium ion battery to thereby accurately detect the remaining capacity, and includes no description concerning a solution to degradation of the secondary battery itself.

It is therefore an advantage of the present invention to suppress degradation of a secondary battery due to charging. Another advantage of the present invention is to extend the EV travelling distance as well as to suppress degradation of a secondary battery due to charging.

DISCLOSURE OF THE INVENTION

In accordance with an aspect of the invention, there is provided an electric vehicle that includes a secondary battery which is charged from an external power source, and travels by using power of the secondary battery, including a charging unit that charges the secondary battery up to a charge capacity which is lower than a full charge capacity of the secondary battery, and stops charging, and a recharging unit that recharges the secondary battery up to the full charge capacity of the secondary battery after charging by the charging unit is stopped, and stops charging.

Preferably, in the electric vehicle of the present invention, the charging unit may start charging when the secondary battery is placed in a state in which the secondary battery can be charged from the external power source.

Preferably, the electric vehicle of the present invention may include a memory unit that stores an actuation time of the electric vehicle, and the recharging unit may start recharging based on the actuation time, or the electric vehicle of the present invention may include a preliminary air conditioning unit that actuates an air conditioning unit before actuation of the electric vehicle, and the recharging unit may start recharging based on an operation of the preliminary air conditioning unit.

In accordance with another aspect of the invention, there is provided an electric vehicle that includes a secondary battery which is charged from an external power source, and travels by using power of the secondary battery, including a number acquiring unit that acquires a number of successive instances in which a remaining capacity of the secondary battery when the vehicle stops is equal to or greater than a predetermined capacity, and a charging unit that charges the secondary battery up to a charge capacity which is lower than a full charge capacity during stop of the vehicle, when the number acquired by the number acquiring unit is a predetermined number or greater.

Preferably, the electric vehicle according to the present invention may include a recharging unit that starts recharging up to the full charge capacity when actuation of the vehicle is expected, after the secondary battery is charged up to a charge capacity which is lower than the full charge capacity during stop of the vehicle by the charging unit.

In accordance with a further aspect of the invention, there is provided a method of charging an electric vehicle that includes a secondary battery which is charged from an external power source, and travels by using power of the secondary battery, the method including a charging step of charging the secondary battery up to a charge capacity which is lower than a full charge capacity of the secondary battery, and stopping charging, and a recharging step of recharging the secondary battery up to the full charge capacity of the secondary battery after charging by the charging step is stopped, and stopping charging.

Preferably, in the method of charging the secondary battery of an electric vehicle of the present invention, the charging step may comprise starting charging when the secondary battery is placed in a state in which the secondary battery can be charged from the external power source.

Preferably, the method of charging the secondary battery of an electric vehicle of the present invention may include a storing step of storing an actuation time of the electric vehicle, and the recharging step may include starting recharging based on the actuation time, or the method of charging the secondary battery of an electric vehicle of the present invention may include a preliminary air conditioning step of actuating an air conditioning unit before actuation of the electric vehicle, and the recharging step may include starting recharging based on an operation of the preliminary air conditioning unit.

In accordance with a still further aspect of the invention, there is provided a method of charging an electric vehicle that includes a secondary battery which is charged from an external power source, and travels by using power of the secondary battery, the method including a number acquiring step of acquiring a number of successive instances in which a remaining capacity of the secondary battery when the vehicle stops is equal to or greater than a predetermined capacity, and a charging step of charging the secondary battery up to a charge capacity which is lower than a full charge capacity during stop of the vehicle, when the number acquired by the number acquiring unit is a predetermined number or greater.

Preferably, the method of charging the secondary battery of an electric vehicle of the present invention may include a recharging step of starting recharging up to the full charge capacity when actuation of the vehicle is expected, after the secondary battery is charged up to a charge capacity which is lower than the full charge capacity during stop of the vehicle by the charging unit.

ADVANTAGE OF THE INVENTION

According to the prevent invention, an advantage that degradation of a secondary battery due to charging can be suppressed can be achieved. Further, according to the prevent invention, an advantage that the EV travelling distance can be extended, and also degradation of a secondary battery due to charging can be suppressed, can be achieved.

BRIEF DESCRIPTION OF THE DRAWINGS

These and other objects of the invention will be explained in the description below, in connection with the accompanying drawings, in which.

Figure 1:
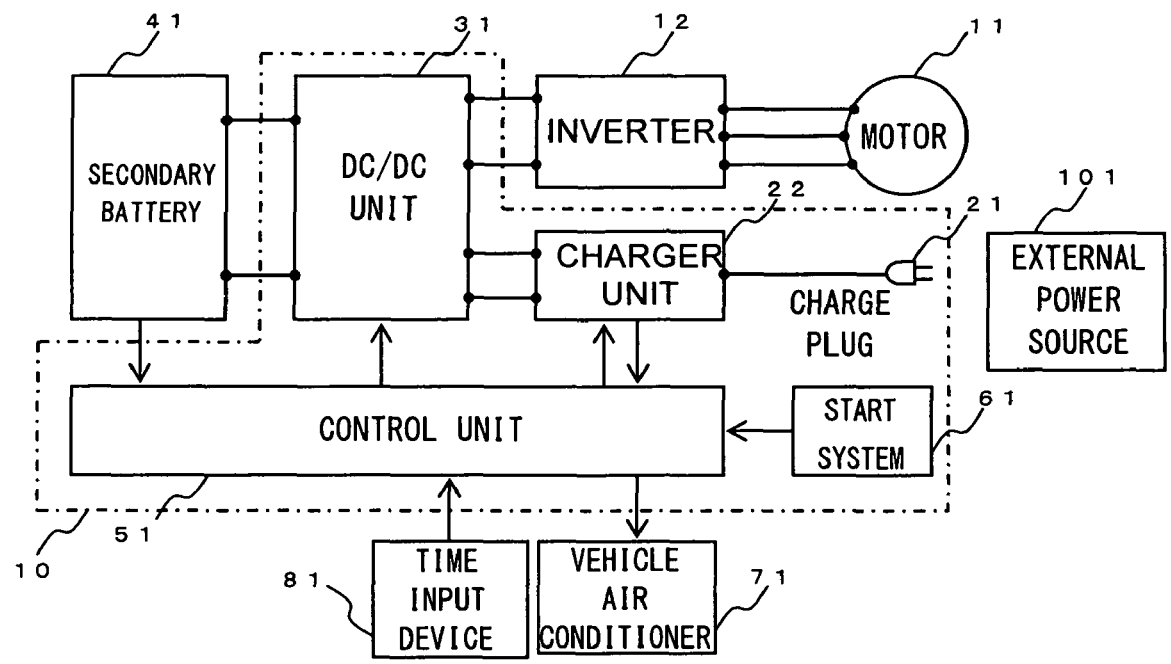
FIG. 1 is a view illustrating a structure of an electric vehicle in which a secondary battery charging apparatus according to an embodiment of the present invention is mounted.

DESIGNATION OF NUMERALS 10 secondary battery charging apparatus
11 motor
12 inverter
21 charge plug
22 charger unit
31 DC/DC unit
41: secondary battery
51: control unit
61: start system
71: vehicle air-conditioner
81: time input device
101: external power source

BEST MODE FOR CARRYING OUT THE INVENTION

Preferred embodiments of the present invention will be described in detail with reference to the drawings.

While in the following description, an electric vehicle including a motor as a driving source will be described, the driving source may be a motor generator having a combined function of a motor and a generator, or a vehicle may be a hybrid vehicle further including an engine as a power source in addition to the motor. A secondary battery as an electric power source for a vehicle is a lithium ion secondary battery and a secondary battery whose degradation is similar to that of a lithium ion battery. While a charger unit which is disposed within the vehicle will be described, the charger unit may be externally provided. Further, while a control unit is formed of a CPU, a plurality of CPUs may form the control unit.

FIG. 1 illustrates a structure of an electric vehicle including a secondary battery charging apparatus 10. The electric vehicle including the secondary battery charging apparatus 10 includes a charger unit 22 which is connected, via a charge plug 21, to an external power source 101 such as a commercial power source or a charging station, for charging a secondary battery 41 with the electric power supplied, a DC/DC unit 31 having a DC/DC converter circuit for raising or lowering a direct current voltage, a secondary battery 41 serving as a power source for the vehicle, an inverter 12 for converting a direct current electric power on the secondary battery 41 side to a driving alternating current electric power of a motor 11, a motor 11 serving as a driving source of the vehicle, a start system 61 for actuating/stopping the vehicle, and a control unit 51 which performs information acquisition or control with respect to each component. The charge plug 21, the charger unit 22, the DC/DC unit 31, and the start system 61 constitute the secondary battery charging apparatus 10. While in this embodiment, a charging operation is performed with the charge plug 21 being connected to the external power source, non-contact charging using electromagnetic induction, in which a primary coil is provided on the external power source side and a secondary coil is provided on the vehicle side, without using the charge plug, may be performed.

The charger unit 22, which is connected to the external power source 101 such as a commercial power source and a charging station via the charge plug 21, converts an alternating current power which is externally supplied to a direct current power and outputs the direct current power to the DC/DC unit 31. The DC/DC unit 31 transforms a voltage of the direct current power output from the charger unit 22 and outputs the transformed direct current power to the secondary battery 41 by switching the internal connection, to charge the secondary battery 41 for storing driving power. The voltage of the direct current power output from the secondary battery 41 is transformed by the DC/DC unit 31 and, by switching the internal connection, is output to the inverter 12. The inverter 12 converts the direct current power which is input to a three-phase alternating current by a switching element provided within the inverter 12 and outputs the three-phase alternating current to the motor 11. The three-phase alternating current output from the inverter 12 drives the motor 11 to allow the electric vehicle to travel.

The secondary battery 41, the DC/DC unit 31, the charger unit 22, the starting system 61, a vehicle air conditioner 71, and a time input device 81 are connected to the control unit 51 via signal lines and are configured to enable input of a control signal and output of a state. Further, the control unit 51 has a function of holding a current time.

The operation of the secondary battery charging apparatus 10 of the electric vehicle having the above structure and the operation in the control unit 51 will be described with reference to a flow chart illustrated in FIG. 2 and an embodiment illustrated in FIG. 3.

Figure 2:
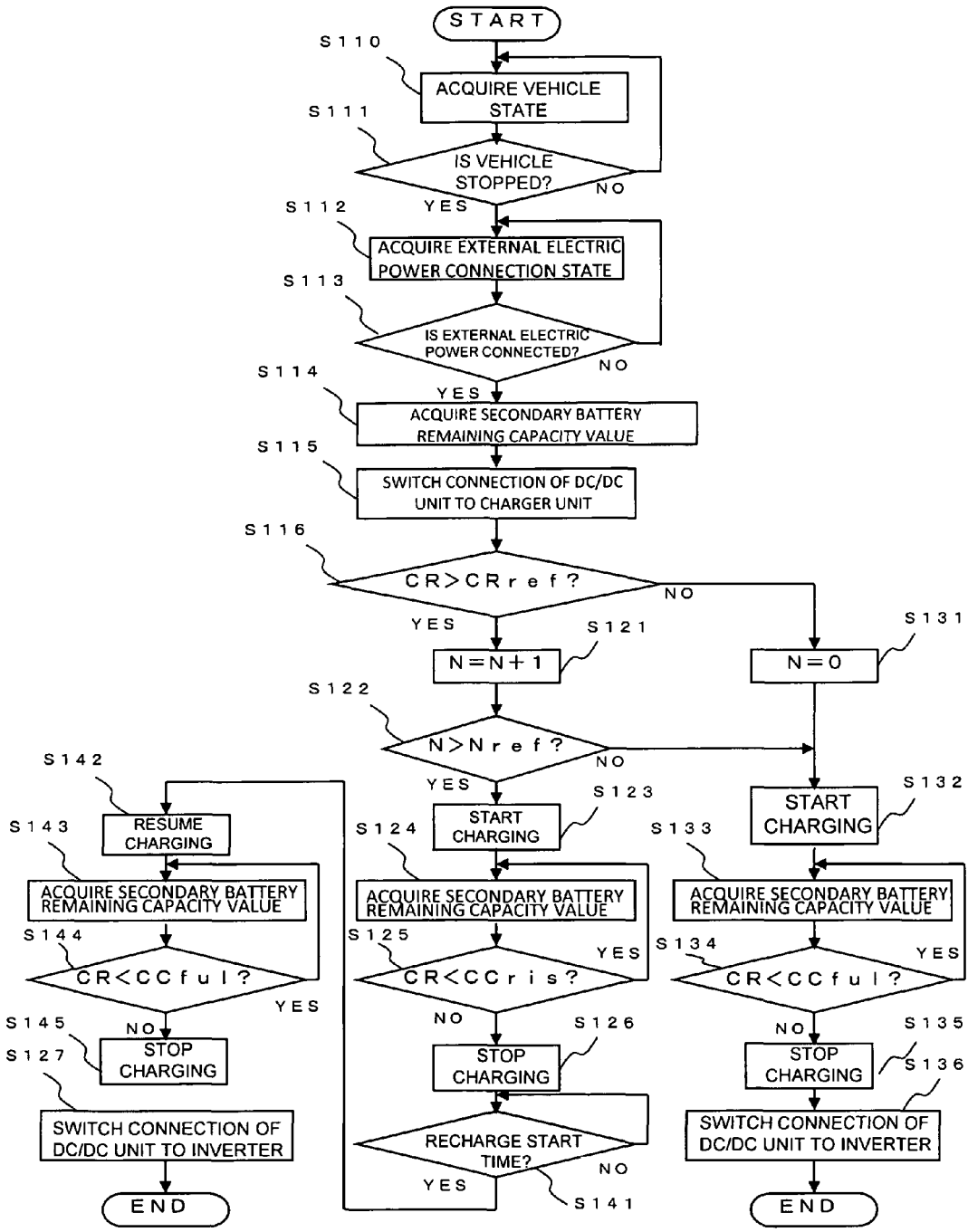
FIG. 2 is a flowchart illustrating an operation of the secondary battery charging apparatus of an electric vehicle according to the embodiment of the present invention.

As shown by a time point a1, during travelling of a vehicle, the control unit 51 acquires a vehicle state from the start system 61 to determine a stop state of the vehicle, as shown in steps S110 to S111 in FIG. 2. More specifically, the control unit 51 acquires data output concerning a vehicle state by serial transfer or output of a logic signal by a signal line, and compares the acquired data with a data definition of the vehicle stop state or definition of a logic signal which is prestored in a storage device within the control unit 51. At the time point a1, the control unit 51 determines that a vehicle is not stopped because the acquired data and logical signal do not indicate a stop state of the vehicle. Then, the process returns to step S110 where acquisition of a vehicle state is continued.

Figure 3:
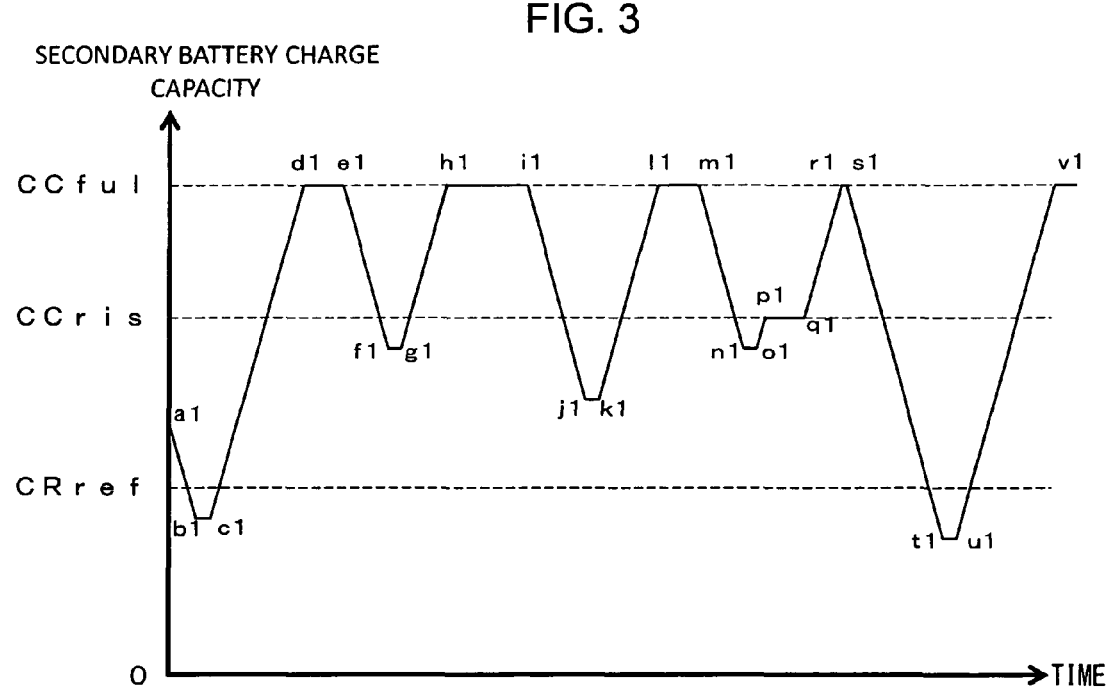
FIG. 3 is a chart indicating a change in the secondary battery charge capacity, with respect to time, of an electric vehicle in which the secondary battery charging apparatus according to an embodiment of the present invention is mounted.

During acquisition of a state of the vehicle by the control unit 51 as indicated by step S110 of FIG. 2, when the driver stops the vehicle as indicated by the time point b1 in FIG. 3, the control unit 51 determines that the vehicle is stopped in step S111. Here, "stop of vehicle" refers to a state in which the driver terminates travelling of the vehicle and parks the vehicle in a garage and elsewhere, with the driving source or the like of the vehicle being continuously stopped and the motor 11 and the inverter 12 not functioning, and does not refer to a temporary "stop" at a traffic light or rail-road crossing, or the like.

The control unit 51, based on the determination of stop of the vehicle in step S111 of FIG. 2, acquires an external electric power connection state in step S112. The control unit 51 acquires a connection state of the external electric power due to the charge plug 21 from the charger unit 22. Specifically, the connection state of the external electric power is acquired by using serial data or a logic signal in a manner similar to that of the vehicle state acquisition in step S110. At the time point b1 in FIG. 3, the control unit 51 determines that the vehicle is not connected to the external power source 101 because the acquired data or logic signal does not indicate connection to the external power source. The process then returns to step S112 in FIG. 2, where acquisition of the external electric power connection state is continued.

During acquisition of the external electric power connection state by the control unit 51 as indicated in step S112 of FIG. 2, when the driver connects the charge plug 21 of the vehicle to the external power source 101 as indicated by the time point c1 in FIG. 3, the control unit 51 determines that the vehicle is connected to the external electric power in step S113. Subsequently, the control unit 51 acquires a secondary battery remaining capacity value CR from the secondary battery 41 in step S114. Specifically, the control unit 51 acquires a digital value of the remaining capacity value of the secondary battery by serial transfer, or acquires an output in the form of a logical signal of the remaining capacity value of the secondary battery or an output in the form of a voltage value of an analog signal and so on through an appropriate electric communication unit.

Then, as shown in step S115 of FIG. 2, the control unit 51, in order to perform a charging operation, controls the DC/DC unit 31 to switch its connection with the inverter 12 to its connection with the charger unit 22. This switching operation is achieved by an electronic or mechanical switching unit within the DC/DC unit 31.

Specifically, as shown in step S116 of FIG. 2, the control unit 51 compares the secondary battery remaining capacity value CR which is acquired with a predetermined reference remaining capacity value CRref. The control unit 51 determines a low capacity state when the secondary battery remaining capacity value CR is equal to or less than the reference remaining capacity value CRref, and determines a high capacity state when the secondary battery remaining capacity value CR is greater than the reference remaining capacity value CRref. This reference remaining capacity value CRref is an upper limit value of the capacity which allows sufficient suppression of degradation of the secondary battery regardless of the charge capacity to be obtained thereafter.

As the secondary battery remaining capacity value CR is lower than the reference remaining capacity value CRref at the time point c1 in FIG. 3, the control unit 51 determines the low capacity state in step S116 in FIG. 2, and then 0 is obtained as the number of successive high capacity states N (hereinafter referred to as a "high capacity state succession number N") in step S131. This high capacity states succession number N is obtained by extracting a high capacity state continuation time period, as a number of times, for every charging operation. In the present embodiment, the high capacity state succession number N is the number of successive instances in which the secondary battery remaining capacity value CR of the secondary battery 41 at the time of stop of the vehicle is equal to or greater than the reference remaining capacity value CRref, i.e. the number of successive high capacity states. Further, the high capacity state succession number N is an updatable parameter which is stored in an appropriate storage device within the control unit 51.

Subsequently, as shown in step S132 of FIG. 2 and the time point c1 of FIG. 3, the control unit 51 sends a command to the charger unit 22 to execute charging to thereby start charging and actuate a full charging unit. Here, in embodiments of the present invention, the charging operation may be started when a user inputs permission to start charging through an input device which is not illustrated in FIG. 1.

When charging is started and the full charging unit is actuated in step S132 of FIG. 2, the control unit 51 acquires the secondary battery remaining capacity value CR for comparison with a full-charge capacity CCful in steps S133 through S134. Here, the full-charge capacity CCful should not necessarily be an upper limit of the chargeable capacity of the secondary battery, and may be a fixed capacity which is set by previously measuring and reviewing the characteristics of the secondary battery. When the secondary battery remaining capacity value CR is lower than the full charge capacity CCful in step S134, the process returns to step S133 where the control unit 51 acquires the secondary battery remaining capacity value CR and continues charging as indicated by time points c1 to d1. When the secondary battery remaining capacity value CR reaches the full charge capacity CCful in step S134, the control unit 51 sends a command to the charger unit 22 to stop charging to thereby stop charging and terminates the full charging unit, as indicated by step S135 and a time point d1 in FIG. 3. Here, the full charging is performed because it is determined that degradation of the secondary battery 41 is less likely based on the conditions where the secondary battery 41 is in a low capacity state and a succession of the high capacity states is not determined at the time point c1 of FIG. 3.

When charging is terminated and the full charging unit is terminated in step S135 in FIG. 2, the control unit 51, in order to enable EV travelling of the vehicle, controls the DC/DC unit 31 to switch its connection with the charger unit 22 to its connection with the inverter 12 in step S136, and then terminates the operation.

The period between time points d1 and e1 in FIG. 3 corresponds to a state in which the charging apparatus is left uncontrolled after completion of charging. At the time point e1, the driver actuates the vehicle to start travelling, and the charge capacity of the secondary battery 41 decreases. The control unit 51 starts an operation simultaneously with the actuation of the vehicle. In step S111, it is determined that the vehicle is travelling, and the process returns to step S110 where acquisition of the state of the vehicle is continued.

At a time point f1 in FIG. 3, the driver stops the vehicle and then connects the charge plug 21 to the external power source 101. At this time, the control unit 51 performs operations from steps S110 to S116 as before.

As the secondary battery remaining capacity value CR is higher than the reference remaining capacity value CRref at the time point f1 in FIG. 3, the control unit 51 determines a high capacity state in step S116, and adds 1 to the high capacity state succession number N as shown in step S121. Here, as the control unit 51 determines a low capacity state at the time of charging at the time point c1 in FIG. 3 and therefore the high capacity state succession number N=0 is obtained in the previous process in step S131 in FIG. 3, with the addition of 1 to N this time, the high capacity state succession number N=1 is obtained.

Subsequently, in step S122 in FIG. 2, the control unit 51 performs determination based on comparison between the high capacity state succession number N and the reference high capacity state succession number Nref. Here, the reference high capacity state succession number Nref is a threshold value which is set, as an upper limit of the high capacity state succession number which ensures non-degradation of the secondary battery, after previously measuring and reviewing the characteristics of the secondary battery. In the present embodiment, the reference high capacity state succession number Nref is set to Nref=2.

In determination based on comparison in step S122 of FIG. 2, as the high capacity state succession number N is equal to or smaller than the reference high capacity state succession number Nref, the control unit 51 performs operations from step S132 to step S136, and completes full charging at the time point h1 in FIG. 3. The details of these operations are already described above.

During the period from the time point i1 to time point o1 in FIG. 3, the control unit 51 performs operations similar to the operations preformed before. However, as the secondary battery 41 is in a high capacity state at the time point j1, the control unit 51 adds 1 to the high capacity state succession number N in step S121 to obtain a resulting high capacity state succession number N=2, and then starts the full charging unit. As the secondary battery 41 is similarly in a high capacity state at the time point n1, the control unit 51 obtains the high capacity state succession number N=3.

At the time point o1 in FIG. 3, the control unit 51 performs comparison determination with respect to the reference high capacity state succession number Nref in step S122 of FIG. 2. Since, at this time point, the high capacity state succession number is N=3 and the reference high capacity state succession number is Nref=2, i.e. the high capacity state succession number N is greater than the reference high capacity state succession number Nref, the control unit 51 starts the charging unit as shown in step S123.

Once the charging unit is started in step S123 of FIG. 2, the control unit 51 acquires the secondary battery remaining capacity value CR and compares the secondary battery remaining capacity value CR with a degradation suppression charge capacity CCris in steps S124 and S125. If the secondary battery remaining capacity value CR is lower than the degradation suppression charge capacity CCris in step S125, the process returns to step S124 where the control unit 51 acquires the secondary battery remaining capacity CR and continues charging as shown from time points o1 to p1 in FIG. 3. When the secondary battery remaining capacity value CR reaches the degradation suppression charge capacity CCris in step S125, the control unit 51 stops charging by sending a command to stop charging to the charger unit 22 to thereby terminate the charging unit, as shown in step S126 and the time point p1 in FIG. 3. Here, the degradation suppression charge capacity is a capacity which causes substantially no degradation of the secondary battery even if maintained, and which is greater than the reference remaining capacity value CRref and lower than the full-charge capacity CCful.

After completion and termination of charging up to the degradation suppression charging capacity CCris in step S126 of FIG. 2, the control unit 51, in step S141, waits for a recharging start time which is a time point going back from a preset vehicle actuation time by a time period corresponding to a charging time period necessary for the capacity of the secondary battery 41 reaching the full charge capacity CCful from the degradation suppression charging capacity CCris. This charging time period can be obtained by calculation from the full charge capacity CCful, the degradation suppression charge capacity CCris, and the charge rate. Here, the vehicle actuation time is a time point which is input by the device 81 which can input time to the control unit 51 and which is prestored in the storage device within the control unit 51. Further, the recharging recharging unit start time may be set as a time point going back from the preset vehicle actuation time by a time period which is set in the control unit 51 by a time input unit which is not shown.

Further, the recharging start time may be a time at which the vehicle air conditioner 71 starts preliminary air conditioning of the vehicle compartment such that the temperature and the humidity which are set by an input unit, which is not shown, are reached at the vehicle actuation time. In addition, the recharging start time may be set to a time at which the temperature within the vehicle compartment detected by a temperature detection unit, which is not shown, falls within a predetermined range of the set temperature and humidity.

In step S141 of FIG. 2, the control unit 51 compares the recharging start time with a current time which is internally stored to determine whether or not to start the recharging unit. If both time points coincide with each other, the control unit 51 starts recharging and actuates the recharging unit, as shown in step S142 and time point q1 of FIG. 3. The operations from step S143 to steps S145 are similar to the operations from S133 to S135. After continuous charging as shown from time point q1 to time point r1 of FIG. 3, the control unit 51 terminates the recharging unit. The control unit 51 then controls the DC/DC unit 31 to switch its connection to the inverter 12 in step S127 and terminates the operation.

Here, while a time period from the time point r1 to the time point s1 corresponds to a uncontrolled state after full charging, as it can be expected that the vehicle will start traveling immediately after termination of the recharging unit and therefore the charge capacity of the secondary battery is to be decreased, a time period in which the vehicle is left uncontrolled in its high charge capacity state can be shortened, resulting in suppression of degradation of the secondary battery. The driver then actuates the vehicle to start traveling from the time point s1, and the charge capacity of the secondary battery 41 decreases. As the secondary battery 41 is in a full charged state at the time of starting traveling, a long-distance EV traveling is enabled. The control unit 51 starts the operation simultaneously with the actuation of the vehicle. In step S111, the control unit 51 determines that the vehicle is traveling, and the process returns to step S110 where acquisition of the vehicle state is continued.

At the time point t1, the driver stops the vehicle and thereafter connects the charge plug 21 to the external power source 101. At this time, the control unit 51 performs the operations from step S110 to step S116. The control unit 51 then determines, in step S116, that the secondary battery 41 is in a low charge state, and sets the high capacity state succession number N to 0 in step S131. Subsequently, the control unit starts the full charging unit, completes charging in steps S132 to S135 of FIG. 2 as indicated by time points u1 to v1 of FIG. 3, and terminates the full charging unit. The control unit 51 then controls the DC/DC unit 31 to switch its connection to the inverter 12 in step S136 and terminates the operation.

In the embodiment described above, the control unit 51 determines whether or not the secondary battery is in a high capacity state by comparing the secondary battery remaining capacity value CR with the reference remaining capacity value CRref, and further determines whether or not the high capacity state is successive by comparing the high capacity state succession number N with the reference high capacity state succession number Nref. Then, if it is determined that the high capacity state occurs successively, the capacity of the secondary battery is restricted to the degradation suppression charge capacity CCris which is lower than the full charge capacity CCful to thereby prevent succession of the high capacity state, so that degradation of the secondary battery can be advantageously suppressed. Also, by recharging the secondary battery up to the full charge capacity CCful at a time point when actuation of a vehicle is expected, the advantage of extending the EV traveling distance of the vehicle can be achieved.

Figure 4:
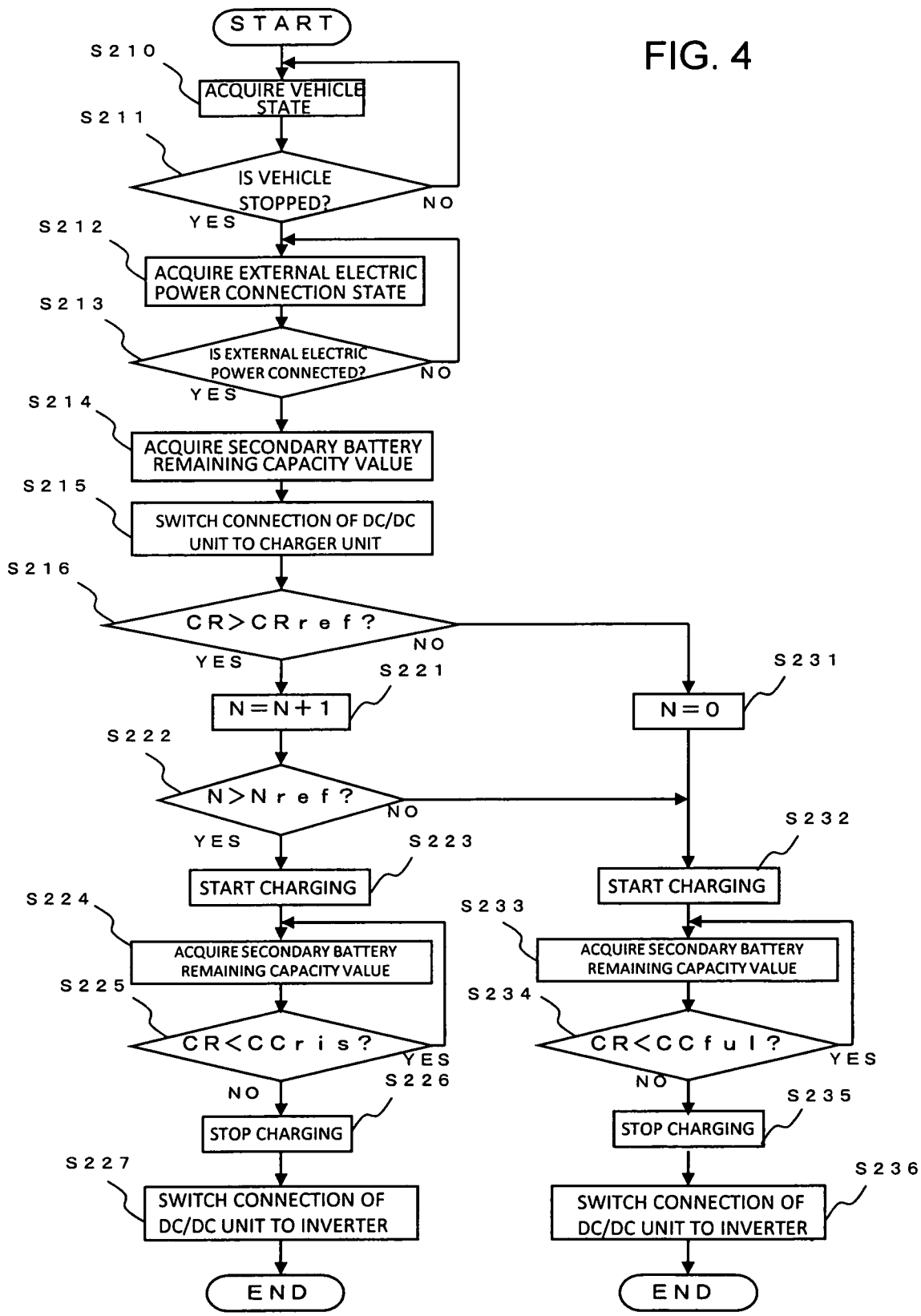
FIG. 4 is a flowchart illustrating an operation of a secondary battery charging apparatus of an electric vehicle according to another embodiment of the present invention.
Figure 5:
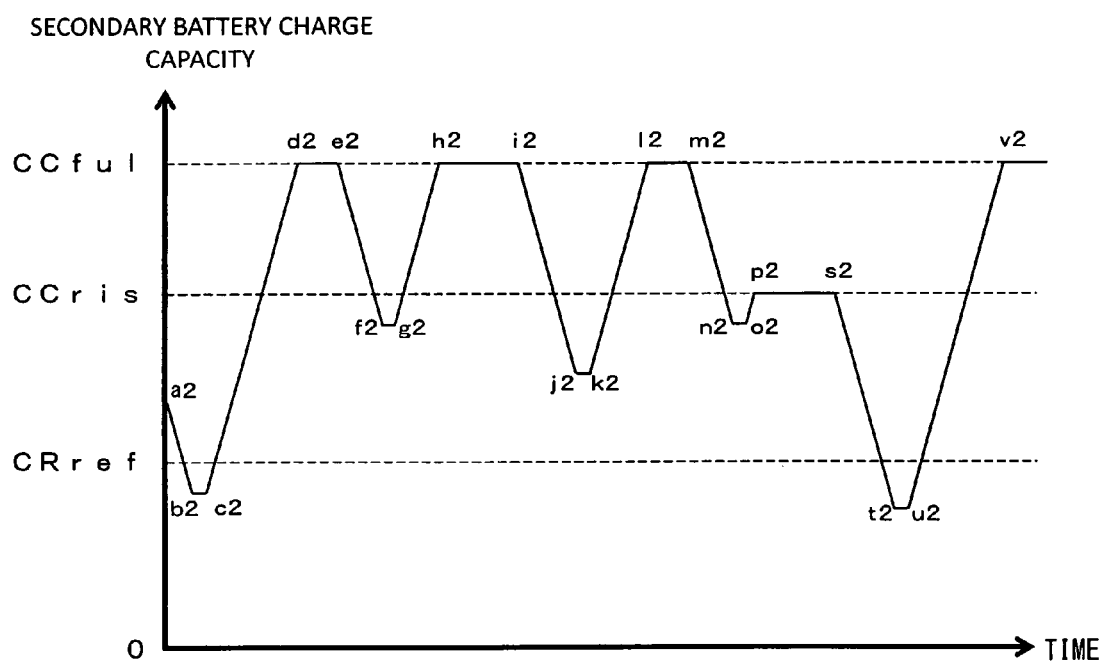
FIG. 5 is a chart indicating a change in the secondary battery charge capacity, with respect to time, of an electric vehicle in which the secondary battery charging apparatus according to the another embodiment of the present invention is mounted.

Another embodiment will now be described with reference to a flowchart of FIG. 4, and FIG. 5. In the flowchart of FIG. 4, the operations in steps S210 to S216, S221 to S227, and S231 to S236 are similar to the operations in steps S110 to S116, S121 to S127, and S131 to S136, respectively of the flowchart of FIG. 2. Further, the operations at time points from a2 to p2 in FIG. 5 are similar to those at time points from a1 to p1 in FIG. 3. The sections of the present embodiment overlapping the above-described embodiment will not be described.

As shown at a time point p2 in FIG. 5, when charging is stopped in step S226 in FIG. 4 after the secondary battery is charged up to the degradation suppression charge capacity CCris and the charging unit is terminated, the control unit 51 controls the DC/DC unit 31 to switch its connection to the inverter 12 in step S227, and the terminates the operation.

The period between times points p2 and S2 in FIG. 5 corresponds to an uncontrolled period after the secondary battery is charged. At this time, because the secondary battery 41 is not charged to the full charge capacity, degradation of the secondary battery 41 can be suppressed even if the uncontrolled time is increased. At time point s2, the driver actuates the vehicle to start travelling, and the charge capacity of the secondary battery decreases. The control unit 51 starts the operation simultaneously with the actuation of the vehicle and determines that the vehicle is travelling in step S211, and the process returns to step S210 where acquisition of a vehicle state is continued.

At time point t2 in FIG. 5, the driver stops the vehicle and then connects the charge plug 21 to the external power source 101. At this time, the control unit 51 performs the operations from step S210 to step S216 as described above. Subsequently, the control unit 51 determines that the secondary battery 41 is in a low capacity state in step S216, and sets the high capacity state succession number N to N=0 in step S231. Thereafter, the control unit 51 actuates the full charging unit, and completes charging from step S232 to step S235, as shown at time points u2 to v2 in FIG. 5, and terminates the full charging unit. In step S236, the control unit 51 controls the DC/DC unit 31 to switch its connection to the inverter 12 and terminates the operation. In this embodiment, the charge capacity of the secondary battery 41 is limited to the degradation suppression charge capacity CCris because the control unit 51 determines, from the high capacity state succession number N, that charging the secondary battery 41 up to the full-charge capacity CCful would result in succession of the high capacity state, which may lead to degradation of the secondary battery 41. Here, if the secondary battery remaining capacity value CR is higher than the degradation suppression charge capacity CCris at the time point n2 of FIG. 5, the secondary battery 41 may be discharged such that the capacity thereof is reduced to the degradation suppression charge capacity CCris by actuating a function of the vehicle, such as an air conditioner, which uses the power of the secondary battery 41.

The invention claimed is:

1. An electric vehicle that includes a secondary battery which is charged from an external power source, and travels by using power of the secondary battery, comprising:
   a charging unit that charges the secondary battery up to a charge capacity which is lower than a full charge capacity of the secondary battery, and stops charging; and
   a preliminary air conditioning unit that actuates an air conditioning unit before actuation of the electric vehicle;
   wherein the charging unit is configured to start recharging based on an operation of the preliminary air conditioning unit after charging by the charging unit is stopped and recharges the secondary battery up to the full charge capacity of the secondary battery, and stops charging.

2. The electric vehicle according to claim 1, wherein the charging unit starts charging when the secondary battery is placed in a state in which the secondary battery can be charged from the external power source.

3. The electric vehicle according to claim 1, comprising:
   a memory unit that stores an actuation time of the electric vehicle,
   wherein the charging unit starts recharging based on the actuation time.

4. The electric vehicle according to claim 2, comprising:
   a memory unit that stores an actuation time of the electric vehicle,
   wherein the charging unit starts recharging based on the actuation time.

5. An electric vehicle that includes a secondary battery which is charged from an external power source, and travels by using power of the secondary battery, comprising:
   a number acquiring unit that acquires a number of successive instances in which a remaining capacity of the secondary battery when the vehicle stops is equal to or greater than a predetermined capacity; and
   a charging unit that charges the secondary battery up to a charge capacity which is lower than a full charge capacity during stop of the vehicle, when the number acquired by the number acquiring unit is a predetermined number or greater.

6. The electric vehicle according to claim 5, comprising:
   a recharging unit that starts recharging up to the full charge capacity when actuation of the vehicle is expected, after the secondary battery is charged up to a charge capacity which is lower than the full charge capacity during stop of the vehicle by the charging unit.

7. A method of charging an electric vehicle that includes a secondary battery which is charged from an external power source, and travels by using power of the secondary battery, the method comprising:

a charging step of charging the secondary battery up to a charge capacity which is lower than a full charge capacity of the secondary battery, and stopping charging;

a preliminary air conditioning step of actuating an air conditioning unit before actuation of the electric vehicle; and a recharging step of starting recharging based on an operation in the preliminary air conditioning step after charging by the charging step is stopped and recharging the secondary battery up to the full charge capacity of the secondary battery and stopping charging.

8. The method of charging an electric vehicle according to claim 7, wherein the charging step comprises starting charging when the secondary battery is placed in a state in which the secondary battery can be charged from the external power source.

9. The method of charging an electric vehicle according to claim 7, comprising:

a storing step of storing an actuation time of the electric vehicle, wherein the recharging step comprises starting recharging based on the actuation time.

10. The method of charging an electric vehicle according to claim 8, comprising:

a storing step of storing an actuation time of the electric vehicle, wherein the recharging step comprises starting recharging based on the actuation time.

11. A method of charging an electric vehicle that includes a secondary battery which is charged from an external power source, and travels by using power of the secondary battery, the method comprising:

a number acquiring step of acquiring a number of successive instances in which a remaining capacity of the secondary battery when the vehicle stops is equal to or greater than a predetermined capacity; and a charging step of charging the secondary battery up to a charge capacity which is lower than a full charge capacity during stop of the vehicle, when the number acquired by the number acquiring unit is a predetermined number or greater.

12. The method of charging an electric vehicle according to claim 11, comprising:

a recharging step of starting recharging up to the full charge capacity when actuation of the vehicle is expected, after the secondary battery is charged up to a charge capacity which is lower than the full charge capacity during stop of the vehicle by the charging unit.

* * * * *